United States Patent Office 3,563,993
Patented Feb. 16, 1971

3,563,993
10-(1-PIPERAZINO)-10,11-DIHYDRO-DIBENZO[b,f]THIEPINS
Walter Schindler, Riehen, near Basel, Erich Schmid, Basel, and Armin Zust, Birsfelden, near Basel, Switzerland, assignors to Geigy Chemical Corporation, Ardsley, N.Y., a corporation of New York
No Drawing. Filed Feb. 17, 1969, Ser. No. 799,955
Claims priority, application Switzerland, Dec. 4, 1968, 18,085/68
Int. Cl. C07d 51/70
U.S. Cl. 260—268                                                3 Claims

ABSTRACT OF THE DISCLOSURE

8 - methoxy - and 8 - methylthio - 10 - (1 - piperazinyl)-10,11 - dihydro - dibenz[b,f]thiepin and the pharmaceutically acceptable acid addition salts thereof, have a depressant effect on the central nervous system; pharmaceutical compositions comprising these compounds and methods of producing a depressant effect in warm-blooded animals are provided.

---

This invention relates to thiepin derivatives, a process for the production thereof, pharmaceutical compositions containing these compounds and the use thereof.

More particularly, the invention relates to compounds of the formula

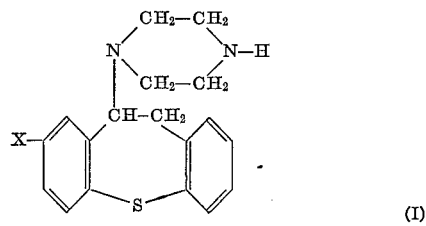

(I)

wherein X is methoxy or methylthio; as well as to pharmaceutically acceptable acid addition salts thereof.

The compounds of this invention have been found to have a general depressant effect on the central nervous system on oral, rectal or parenteral administration, e.g. they reduce motility, potentiate the action of anesthetics and exhibit a positive effect in the "test de la traction." Furthermore, they have an antiemetic action. Their cataleptic effect is small in comparison with the stated central depressant properties. These pharmacological properties of the compounds of the invention are determined in experimental animals by various standard test methods (cp. R. Domenjoz and W. Theobald, Arch. int. Pharmacodyn. 120, 450 (1959); W. Theobald et al., Arch. int. Phrmacodyn. 148, 560 (1964); W. Theobald et al.; Arzneimittelforsch, 17, 561 (1967)).

Thus, it is illustratively demonstrated that 8-methylthio - 10 - (1 - piperazinyl) - 10,11 - dihydro - dibenzo-[b,f] thiepin dihydrochloride, on oral administration in amounts of about 3.8 mg./kg. to mice, decreases the spontaneous orientation motility to a very considerable extent.

The same compound, administered in amounts of about 0.76 mg./kg. subcutaneously, or about 11 mg./kg. orally to mice, prevents about 50% of the animals, hanging on to a wire with their front paws, from pulling up and gripping the wire with their hind paws (test de la traction).

The same compound, administered in amounts of about 2 to 50 mg./kg. subcutaneously to mice, anesthetised intraperitoneally with 40 mg./kg. of the short-acting anesthetic N,N - diethyl - 2 - methoxy - 4 - allyl - phenoxyacetic acid amide, potentiates, i.e., prolongs the effects of the anesthetic to a very significant extent. The antiemetic activity of this compound of the invention as determined in gold hamsters is very pronounced. The cataleptic activity is determined in rats and is found to be advantageously low.

The toxicity of the compounds of the invention as demonstrated in mice on intravenous administration is of favorable low order.

The pharmacological properties render the compounds of the invention suitable for the treatment of states of tension and agitation.

A compound of the general Formula I is produced according to the invention by hydrolysing or hydrogenolysing a compound of the general Formula II

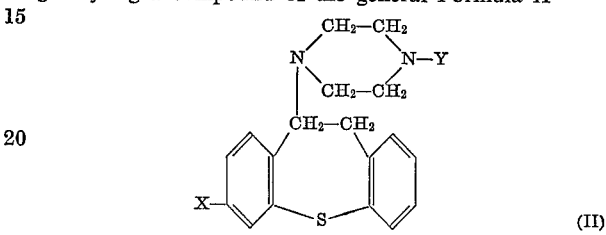

(II)

wherein:

X has the meaning given under Formula I and
Y repersents a radical, which can be replaced by hydrogen by means of hydrolysis or reductive splitting, and optionally converting the obtained reaction product with an inorganic or organic acid into an addition salt.

Radicals Y, which can be converted by hydrolysis into the hydrogen atom are, e.g. acyl radicals, e.g. lower alkanoyl groups such as the acetyl group, aryl-carbonyl groups such as the benzoyl group, radicals of monofunctional derivatives of carbonic acid or thiocarbonic acid such as, e.g., the methoxycarbonyl, ethoxycarbonyl, phenoxycarbonyl or the benzyloxycarbonyl group, or the corresponding thiocarbonyl groups. The hydrolysis can be performed using an alkali metal hydroxide, e.g. potassium or sodium hydroxide, preferably at boiling temperature and either in a higher-boiling organic solvent, which contains hydroxyl groups such as, e.g. ethylene glycol or diethylene glycol, or in a lower monoalkyl ether of a such-like glycol, and, in particular, in a lower alkanol, e.g. methanol or ethanol.

Radicals Y, which are convertible by reductive splitting into the hydrogen atom, are, for example, arylmethyl groups, such as the benzyl group, diarylmethyl groups such as the diphenylmethyl group, or arylmethoxycarbonyl groups such as the benzyloxycarbonyl group. The reductive splitting can be carried out with hydrogen in an inert solvent in the presence of a sulphided noble metal catalyst on a suitable carrier, e.g. in a lower alkanol, such as methanol or ethanol, in the presence of sulphided palladium or platinum on coal.

Starting materials of the general Formula II can be produced, for example, starting with 8-methoxy- or 8-methyl-thio-10-chloro-10,11-dihydro - dibenzo[b,f]thiepin known in the literature. These compounds are reacted for example with 1-piperazine carboxylic acid esters, e.g. with the methyl, ethyl, phenyl or benzyl ester, to give the corresponding esters of the 4-(8-methoxy-10,11-dihydro-dibenzo[b,f]thiepin-10-yl)-1-piperazine carboxylic acid or the 4-(8-methylthio-10,11-dihydro-dibenzo[b,f] thiepin-10-yl)-1-piperazine carboxylic acid. The corresponding thiocarboxylic acid esters can be produced analogously. Compounds of the general Formula II, which are substituted in 4-position of the piperazine ring for example by a lower alkanoyl group, e.g. the acetyl group, by an arylcarbonyl group, e.g. the benzoyl group, or by an arylmethyl group, e.g. the benzyl group, can be analogously produced, e.g. by reacting the 8-methoxy- or the 8 - methylthio - 10 - chloro - 10,11 - dihydro - dibenzo[b,f]thiepin, with the corresponding piperazine derivatives, e.g. with the 1-acetyl, 1-benzoyl or the 1-benzyl piperazine.

The compounds of the general Formula I obtained using the process according to the invention, are then optionally converted, in the usual manner, into their addition salts with inorganic and organic acids. For example, a solution of a compound of the general Formula I in an organic solvent is mixed with the acid desired as the salt component, or with a solution of the acid. For the reaction, organic solvents are preferably chosen, in which the formed salt has low solubility, so that it can be separated by filtration. Such solvents are, e.g. methanol, acetone, methyl-ethyl ketone, acetone/ethanol, methanol/ether or ethanol/ether.

For use as medicaments, pharmaceutically acceptable acid addition salts can be used in place of free bases, i.e. salts with acids, the anions of which are not toxic in the case of the dosages in question. It is moreover of advantage if the salts to be used as medicaments crystallise well and are not, or only slightly, hygroscopic. For salt formation with compounds of the general Formula I, it is possible to use, e.g. hydrochloric acid, hydrobromic acid, sulphuric acid, phosphoric acid, methane sulphonic acid, ethane sulphonic acid, β-hydroxyethane sulphonic acid, acetic acid, malic acid, tartaric acid, citric acid, lactic acid, oxalic acid, succinic acid, fumaric acid, maleic acid, benzoic acid, salicylic acid, phenyl acetic acid, mandelic acid and embonic acid.

As mentioned above, the new active substances are administered orally, rectally or parenterally. The dosage depends on the manner of administration, on the age of the individuum and on the particular condition to be treated. In general the daily dosages of the free bases or of pharmaceutically acceptable salts thereof, vary between 0.10 mg./kg. and 10.5 mg./kg. for warm blooded animals. Suitable dosage units, such as dragees, tablets, suppositories or ampoules, preferably contain 5–200 mg. of an active substance according to the invention, or of a pharmaceutically acceptable salt thereof.

Dosage units for oral administration preferably contain as active substances between 1–90% of a compound of the general Formula I or of a pharmaceutically acceptable salt thereof. They are produced by combining the active substance with, e.g. solid, pulverulent carriers such as lactose, saccharose, sorbitol, mannitol; starches such as potato starch, maize starch or amylopectin, also laminaria powder or citrus pulp powder; cellulose derivatives or gelatine, optionally with the addition of lubricants, such as magnesium or calcium stearate or polyethylene glycols, to form tablets or dragee cores. The latter are coated, e.g. with concentrated sugar solutions, which can also contain, e.g. gum arabic, talcum and/or titanium dioxide, or with a lacquer dissolved in easily volatile organic solvents or mixtures of solvents. Dyestuffs can be added to these coatings, e.g. to distinguish between varying dosages of active substance.

Other suitable dosage units for oral administration are hard capsules made of gelatine as well as soft, closed capsules made of gelatine and a softener such as glycerin. The hard capsules preferably contain the active substance as a granulate, e.g. in admixture with fillers such as maize starch, and/or lubricants such as talcum or magnesium stearate and, optionally, stabilisers, such as sodium metabisulphite ($Na_2S_2O_5$) or ascorbic acid. In soft capsules, the active substance is preferably dissolved or suspended in suitable liquids such as liquid polyethylene glycols, to which stabilisers can also be added.

Suitable dosage units for rectal administration are for example suppositories, which consist of a combination of an active substance or of a suitable salt thereof with a suppository foundation. Suitable as the suppository foundation are, e.g. natural or synthetic triglycerides, paraffin hydrocarbons, polyethylene glycols or higher alkanols. Gelatine rectal capsules are also suitable, which consist of a combination of an active substance or of a suitable salt thereof and a foundation. Examples of the foundation are, e.g. liquid triglycerides, polyethylene glycols or paraffin hydrocarbons.

Ampoules for parenteral, particularly intramuscular, administration preferably contain a water-soluble salt of an active substance in a concentration of preferably 0.5–5%, optionally together with suitable stabilisers and buffer substances, in an aqueous solution.

The following examples will serve to further typify the present invention, but should not be construed as a limitation on the scope thereof.

EXAMPLE 1

(a) 42.0 g. of crude 4-(8-methylthio-10,11-dihydro-dibenzo[b,f]thiepin-10-yl)-1-piperazine carboxylic acid ethyl ester are added to a solution of 64.0 g. of potassium hydroxide in 400 ml. of absolute ethanol. The reaction mixture is refluxed for 16 hours. The ethanol is then distilled off from the mixture, the residue poured on to ice water and the suspension extracted with ether/methylene chloride (2:1). The organic extract is washed with water until the pH is adjusted to 8. The organic solution is then dried over magnesium sulphate and concentrated by evaporation in vacuo. The obtained crude product is taken up in 100 ml. of absolute acetone, mixed with ethereal hydrochloric acid and the precipitated hydrochloride is recrystallised from 96% ethanol/ether. The obtained pure 8 - methylthio-10-(1-piperazinyl)-10,11-dihydro-dibenzo-[b,f]thiepin-hydrochloride melts at 220–222°.

The 4 - (8 - methylthio - 10,11 - dihydro - dibenzo[b,f]thiepin-10-yl)-1-piperazine carboxylic acid ethyl ester, which is used as the starting material, is produced as follows:

(b) 26.9 g. (0.092 mol) of 8-methylthio-10-chloro-10,11-dihydro-dibenzo[b,f]thiepin, M.P. 106–109° are dissolved in 60 ml. of absolute benzene and 47.4 g. (0.3 mol) of 1-piperazine carboxylic acid ethyl ester are added. The reaction mixture is refluxed for 20 hours, poured on to 500 ml. of ice water and extracted with 800 ml. of a mixture of ether/methylene chloride (2:1). The organic extract is washed six times with water, dried over magnesium sulphate and concentrated by evaporation in vacuo. The obtained oily 4-(8-methylthio-10,11-dihydro-dibenzo-[b,f]thiepin-10-yl)-1-piperazine carboxylic acid ethyl ester is used as the crude product.

EXAMPLE 2

The 8 - methoxy-10-(1-piperazinyl)-10,11-dihydro-dibenzo[b,f]thiepin, M.P. 105–107°, is produced, analogously to Example 1(a), from 94.3 g. (0.236 mol) of 4-(8-methoxy - 10,11 - dihydro-dibenzo[b,f]thiepin-10-yl)-1-piperazine carboxylic acid ethyl ester, M.P. 100–102°. The free base is converted in acetone by means of ethereal hydrochloric acid into the dihydrochloride, which melts at 179–181° after being recrystallised from ethanol/ethyl acetate.

The 4 - (8-methoxy-10,11-dihydro-dibenzo[b,f]thiepin-10-yl)-1-piperazine carboxylic acid ethyl ester, which is used as starting material, is produced analogously to Example 1(b), from 8-methoxy-10-chloro-10,11-dihydro-dibenzo[b,f]thiepin and 1-piperazine carboxylic acid ethyl ester.

EXAMPLE 3

18.4 g. (0.05 mol) of 8-methoxy-10-(4-acetyl-1-piperazinyl)-10,11-dihydro-dibenzo[b,f]thiepin and 40.0 g. (0.71 mol) of potassium hydroxide are dissolved in 200 ml. of absolute ethanol and refluxed for 20 hours. After the addition of 200 ml. of water, the ethanol is largely distilled off and the residue extracted with benzene. The benzene phase is washed with water, dried over magnesium sulphate and concentrated by evaporating to dryness in vacuo. The residue is dissolved in acetone and the dihydrochloride precipitated by addition of ethereal hydrochloric acid. After recrystallisation from ethanol/ethyl acetate, the 8-methoxy-10-(1-piperazinyl)-10,11-dihydro-dibenzo[b,f]thiepin-dihydrochloride melts at 179–181°.

The 8 - methoxy-10-(4-acetyl-1-piperazyl)-10,11-dihydro-dibenzo[b,f]thiepin, which is used as the starting material, is obtained by reacting 8-methoxy-10-chloro-10,11-dihydro - dibenzo[b,f]thiepin with 1 - acetyl - piperazine, M.P. 156–157° (from benzene/petroleum ether).

EXAMPLE 4

(a) 4.9 g. (0.01 mol) of 8-methoxy-10-(4-benzyl-1-piperazinyl) - 10,11 - dihydro - dibenzo[b,f]thiepin-dihydrochloride are dissolved in 200 ml. of ethanol and, after the addition of 2 g. of palladium charcoal (5% palladium on active charcoal) the mixture is hydrogenated at 20° and under a hydrogen pressure of 1–2 atm. The absorption of hydrogen is finished after 8 hours. The catalyst is filtered off, washed with hot ethanol and the combined filtrates are concentrated by evaporation to dryness. The obtained residue is shaken with benzene and 2 N sodium hydroxide solution and the benzene solution is then extracted with 1-molar aqueous methane sulphonic acid solution. The acid aqueous solution is made alkaline with concentrated sodium hydroxide solution and extracted with ether/methylene chloride (2:1). The organic phase is then washed with water and dried over magnesium sulphate. After removal of the solvent under vacuum, the obtained base is dissolved in acetone and, by addition of ethereal hydrochloric acid, the dihydrochloride is precipitated. The pure 8-methoxy-10-(1-piperazinyl)-10,11-dihydro-dibenzo[b,f]thiepin-dihydrochloride, M.P. 179–181°, is obtained after recrystallisation from ethanol/ethyl acetate.

The 8 - methoxy-10-(4-benzyl-1-piperazinyl)-10,11-dihydro-dibenzo[b,f]thiepin, which is required as the starting product, is produced as follows:

(b) 18.0 g. (0.12 mol) of 1-benzyl-piperazine are added dropwise to a solution of 7.0 g. (0.0256 mol) of 8-methoxy-10-chloro-10,11-dihydro - dibenzo[b,f,]thiepin in 40 ml. of absolute benzene. After being refluxed for 20 hours, the reaction mixture is poured onto 200 ml. of ice water and, after addition of 25 ml. of 2 N sodium hydroxide solution, it is extracted with benzene. The organic phase is repeatedly washed with water and then extracted with 60 ml. of 1-molar aqueous methane sulphonic acid solution. The acid aqueous solution is made alkaline with concentrated sodium hydroxide solution and re-extracted with ether/methylene chloride (2:1). The organic extracts are then washed with water, dried over magnesium sulphate and the solvents are removed under vacuum. The residue is recrystallised from benzene/petroleum ether. The pure 8 - methoxy-10-(4-benzyl-1-piperazinyl)-10,11-dihydro - dibenzo[b,f]thiepin melts at 118–120°. The dihydrochloride has a M.P. of 224–226° (from ethanol/ethyl acetate).

The 8 - methylthio - 10-(4-benzyl-1-piperazinyl)-10,11-dihydro-dibenzo[b,f]thiepin is produced in an analogous manner and from this is obtained the 8-methylthio-10-(1-piperazinyl)-10,11-dihydro - dibenzo[b,f]thiepin - hydrochloride, M.P. 220–222°.

EXAMPLE 5

250 g. of 8 - methoxy - 10-(1-piperazinyl)-10,11-dihydro-dibenzo[b,f]thiepin - dihydrochloride are mixed with 175.80 g. of lactose and 169.70 g. of potato starch. The mixture is moistened with an alcoholic solution of 10 g. of stearic acid and granulated through a sieve. After drying, 160 g. of potato starch, 200 g. of talcum, 2.5 g. of magnesium stearate and 32 g. of colloidal silicon dioxide are mixed in and the mixture is pressed into 10,000 tablets, each weighing 100 mg. and each containing 25 mg. of active substance. Optionally, the tablets can be provided with grooves for more accurate adjustment of the dosage amount.

EXAMPLE 6

A granulate is produced from 250 g. of 8-methylthio-10-(1-piperazinyl)-10,11 - dihydro - dibenzo[b,f]thiepin-hydrochloride, 175.90 g. of lactose and the alcoholic solution of 10 g. of stearic acid. After drying, the granulate is mixed with 56.60 g. of colloidal silicon dioxide, 165 g. of talcum, 20 g. of potato starch and 2.50 g. of magnesium stearate and the mixture is pressed into 10,000 dragée cores. These are subsequently coated with a concentrated syrup made from 502.28 g. of crystallised saccharose, 6 g. of shellac, 10 g. of gum arabic, 0.22 g. of dyestuff and 1.5 g. of titanium dioxide, and dried. The obtained dragées each weigh 120 mg. and each contain 25 mg. of active substance.

EXAMPLE 7

To produce 1000 capsules each containing 25 mg. of active substance, 25 g. of 8-methoxy-10-(1-piperazinyl)-10,11 - dihydro-dibenzo[b,f]thiepin-dihydrochloride are mixed with 248.0 g. of lactose. The mixture is evenly moistened with an aqueous solution of 2.0 g. of gelatine and is granulated through a suitable sieve (e.g. Sieve No. III, Ph. Helv. V). The granulate is mixed with 10.0 g. of dried maize starch and 15.0 g. of talcum. The mixture is uniformly filled into 1000 hard gelatine capsules, Size 1.

EXAMPLE 8

A suppository foundation is prepared from 2.5 g. of 8-methylthio-10-(1-piperazinyl)-10,11-dihydro - dibenzo[b,f]thiepin-hydrochloride and 167.5 g. of adeps solidus. 100 suppositories are filled from the mixture each containing 25 mg. of active substance.

EXAMPLE 9

A solution of 25 g. of 8-methylthio-10-(1-piperazinyl)-10,11 - dihydro-dibenzo[b,f]thiepin-hydrochloride in one litre of water is filled into 1000 ampoules and sterilised. An ampoule contains a 2.5% solution of 25 mg. of active substance.

What is claimed is:

1. A compound of the formula

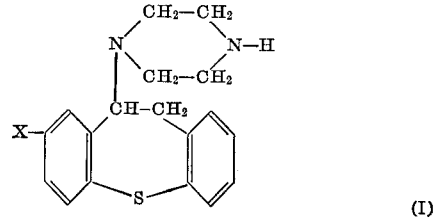

wherein X is methoxy or methylthio, and the pharmaceutically acceptable acid addition salts thereof.

2. A compound according to claim 1, wherein X is methoxy; and the dihydrochloride thereof.

3. A compound according to claim 1, wherein X is methylthio; and the hydrochloride thereof.

References Cited

UNITED STATES PATENTS 3,337,554  8/1967  Jilek et al. _____ 260—268
3,351,599  11/1967  Protiva et al. _____ 260—268

DONALD G. DAUS, Primary Examiner

U.S. Cl. X.R.

260—327, 559; 424—250